US007643253B2

(12) United States Patent
Yao et al.

(10) Patent No.: US 7,643,253 B2
(45) Date of Patent: Jan. 5, 2010

(54) HGA ROTATIONAL MICRO-ACTUATOR INCLUDING AN S-SHAPED FRAME AND METHOD OF MAKING THEREOF

(75) Inventors: Minggao Yao, Hong Kong (CN); Yiru Xie, Hong Kong (CN); Wei Ma, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 396 days.

(21) Appl. No.: 11/536,558

(22) Filed: Sep. 28, 2006

(65) Prior Publication Data

US 2008/0030904 A1 Feb. 7, 2008

(30) Foreign Application Priority Data

Aug. 7, 2006 (CN) .................. 2006 1 0104261

(51) Int. Cl.
*G11B 5/56* (2006.01)
(52) U.S. Cl. .................................. 360/294.4
(58) Field of Classification Search .............. 360/294.4, 360/294.1, 294.3
See application file for complete search history.

(56) References Cited

U.S. PATENT DOCUMENTS 4,976,553 A * 12/1990 Yamaguchi et al. .... 400/124.16
6,246,552 B1 * 6/2001 Soeno et al. ............. 360/294.4
6,671,131 B2    12/2003 Kasajima et al.
7,057,857 B1 *  6/2006 Niu et al. ................ 360/245.4
7,222,535 B2 *  5/2007 Shoji ....................... 73/514.31
7,352,538 B2 *  4/2008 Kurihara et al. .......... 360/294.4
7,474,038 B2 *  1/2009 Takahashi et al. ....... 310/323.02
2001/0055182 A1 * 12/2001 Wu et al. ................. 360/294.4
2003/0202290 A1 * 10/2003 Pan et al. ................. 360/294.4
2006/0181812 A1 *  8/2006 Kwon et al. ............. 360/294.4
2007/0268950 A1 * 11/2007 Spinelli et al. ............... 372/99

* cited by examiner

*Primary Examiner*—Jefferson Evans
(74) *Attorney, Agent, or Firm*—Workman Nydegger

(57) ABSTRACT

A rotational micro-actuator (20) used in hard disk driver is disclosed. It comprises a frame (21) approximately in the shape of letter "S" and PZT pieces (28, 29) attached to said frame (21), wherein said frame (21) is formed with a central coupling portion (213) by which the micro-actuator (20) is coupled to a suspension tongue (177), and two pieces of said PZT (28, 29) are arranged in central symmetry manner about said central coupling portion (213) such that said micro-actuator (20) can rotate about said central coupling portion (213) in response to the driving signals applied to said PZT pieces (28, 29), thus cause the displacement of the head element secured to the micro-actuator (20) so as to achieve the fine positioning of the head element. With above configuration, the micro-actuator of this invention will not cause the resonance of the suspension base plate during operation. Thereby the servo bandwidth of the hard disk driver is expanded.

8 Claims, 12 Drawing Sheets

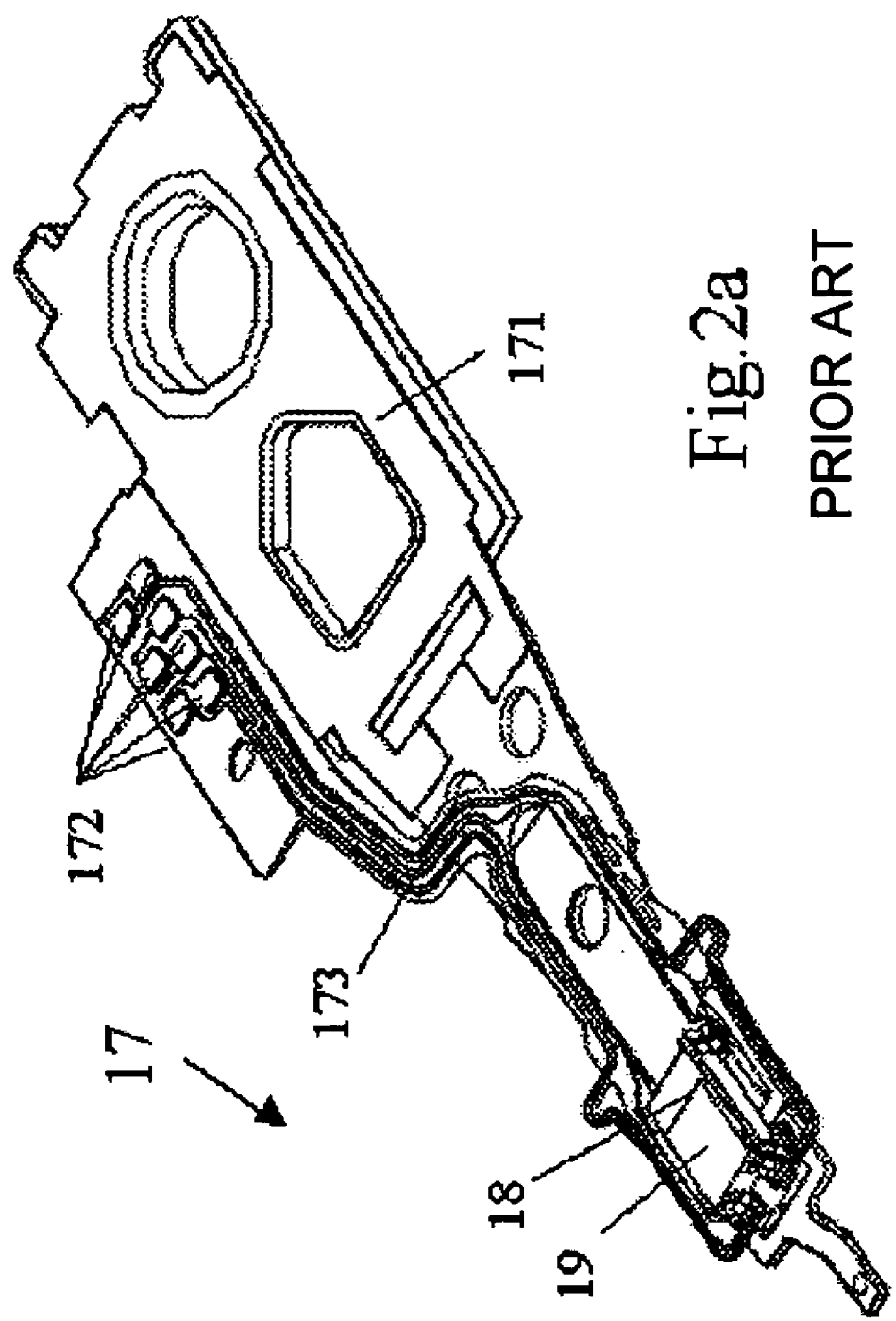

HGA ROTATIONAL MICRO-ACTUATOR INCLUDING AN S-SHAPED FRAME AND METHOD OF MAKING THEREOF

FIELD OF THE INVENTION

The present invention relates to an information-recording device, and particularly to a rotational micro-actuator of a head gimbal assembly (HGA) used in a disk drive unit, and a method for manufacturing the head gimbal assembly equipped with the rotational micro-actuator.

BACKGROUND OF THE INVENTION

With the development of the information technology, information-recording device, such as hard disk driver (HDD), is widely used. The HDD can store data by means of the magnetic recording medium. FIG. 1 shows the typical configuration of a conventional HDD, in which disk 10 spins about axis 11 at relatively high speed, and drive arm 16 controls the head element (not shown) located at the tip of the HGA 17 to fly above the surface of the disk 10 such that the head element can perform read/write operation at various tracks. Generally, a voice coil motor (VCM) 15 serves as the main actuator to make the drive arm 16 mounted on the carrier 14 rotate about bearing 13, so that the course adjustment of the position of the head element relative to the surface of the disk 10 can be performed.

However, because of the large inertia of the VCM, a quick and fine position control of the head element cannot be obtained. In order to perform fine adjustment to the position of the head element, an HGA 17 is provided on the tip of the drive arm 16. FIG. 2a shows the detail structure of the conventional HGA 17 shown in FIG. 1, which is disclosed in U.S. Pat. No. 6,671,131. FIG. 2b shows the enlarged view of the front end of the HGA 17. As can be seen, the conventional HGA 17 includes a suspension 171 and a micro-actuator 18 mounted in the tongue area of the suspension 171. The head element 19 is mounted within the micro-actuator 18 and can move independent of the suspension 171 by the actuation of the micro-actuator 18. Therefore, the position of the head element 19 can be adjusted at much smaller scale and much higher frequency. Accordingly, the TPI (tracks per inch) value of the HDD can be increased by 50%.

As can be seen in FIGS. 2a and 2b, the conventional micro-actuator 18 with head element 19 is mounted at the suspension tongue (not shown) of the suspension 171. FIG. 2c shows the exploded perspective view of the conventional micro-actuator 18 in turn over state. The micro-actuator 18 includes metal frame composed of bottom portion 186, support portion 182, two opposite arm 184 and 185 extending from the bottom portion 186 and support portion 182 perpendicularly, and two pieces of piezoelectric PZT (Piezoelectric Lead Zirconate Titanate) 181 and 183 are attached to the outside surfaces of two opposite arms. The PZT pieces 181, 183 can be made from ceramics material, or may be thin-film PZT. The head element 19 constituted with slider and the read/writer transducer (not shown) located at the center of the slider is mounted on the support portion 182 of the metal frame. The micro-actuator 18 with the head element 19 is mounted on the HGA 17 by fixedly securing the bottom portion 186 of the micro-actuator to the suspension tongue. Micro-actuator 18 is electrically connected to the suspension pad 172 via suspension traces 173, other end of which is connected to three electrical bonding balls 192 (GBB or SBB) formed on each outside surface of the arms 184 and 185. Similarly, multiple electrical bonding balls for example four electrical bonding balls 191 (GBB or SBB) are located on front surface of the head element 19, by which the head element 19 is connected with the suspension pad 172 via suspension traces 173. Thus, the power supply and control signals can be applied to the micro-actuator 18 and the head element 19 via the suspension traces 173.

As shown in FIG. 2d, when driving signals are applied to the PZT pieces 181 and 183 via traces 173, the PZT pieces 181 and 183 will shrink or expand in response to the driving signals so that the arms 184 and 185 deform together with the PZT pieces. The head element 19 mounted on the support portion of the micro-actuator will displace in a small scale, thus the fine adjustment of the head element will be achieved.

As can be learned from the operation procedure described above, conventional micro-actuator 18 works in a translation mode. In this case, the head element 19 will intermittently sway due to the shrinking and expanding of the PZT pieces 181 and 183, which intermittent sway movement will in turn cause a reaction force F' applied to the suspension tongue by the bottom portion 186 of the micro-actuator. This intermittent reaction force will lead to the resonance of the suspension 171 such that the performance of the HDD, particularly the servo bandwidth of the HDD is limited.

FIG. 2e is the graph showing the resonance of the PZT and base plate of the suspension respectively according to the prior art, in which the horizontal axis represents resonance frequency (Hz) while the vertical axis represents vibration gain (dB). The curve 121 shows the curve of resonance gain vs. the exciting frequency of PZT pieces and the curve 122 shows the curve of the resonance gain vs. the exciting frequency of the base plate of the suspension. As can be seen from the figure, the curve for the PZT exciting and the resonance curve for the base plate of the suspension are substantially similar, which means that the sway of the PZT pieces will excite the resonance of the base plate of the suspension. This is disadvantageous for the fine position of the head element 19.

SUMMARY OF THE INVENTION

In view of above described disadvantages of the prior art, the object of this invention is to provide a novel micro-actuator used in the HGA of disk drive unit, which will not cause the resonance of the suspension during the operation procedure so that the servo bandwidth of the HDD can be expanded.

In order to achieve above object, one aspect of this invention provides a rotational micro-actuator comprising a frame and PZT pieces attached to said frame, wherein said frame includes a central coupling portion for attaching the micro-actuator to a suspension tongue, and two pieces of said PZT attached to said frame are arranged central symmetrically with each other about said central coupling portion, thereby said micro-actuator can rotate about said central coupling portion in response to the driving signal applied to said two pieces of the PZT.

With above configuration of this invention, since the micro-actuator is secured to the suspension tongue only by the central coupling portion, and said two pieces of PZT are arranged in a manner of central symmetry about the central coupling portion, the reaction forces applied to the suspension tongue upon the deformation of the PZT pieces will balance out, i.e., there are no reaction forces applied to the suspension tongue, thus the resonance of the suspension will be suppressed or obviated.

Preferably, the frame is further formed with end coupling portions at the two ends thereof, by which a head element is fixedly mounted to said rotational micro-actuator. The head element is stacked to the top surface of said rotational micro-actuator only by said two end coupling portion, thus the assembled head element will not hinder the deformation of the micro-actuator.

Preferably, said frame further includes two arms, which are formed to be central symmetric with each other about said central coupling portion, between said end coupling portion and said central coupling portion, and said PZT pieces being attached to the outside surfaces of said arms. The arms are provided for the attaching of the PZT pieces.

Preferably, a first notch and a second notch are formed on the respective sides of the arms to which the PZT pieces are not attached in such a manner that the first notch and second notch open in opposite direction such that the whole frame takes the shape of letter "S". The formation of first notch and second notch further facilitates the deformation of the arm by the PZT pieces.

In another aspect of this invention, a head gimbal assembly is provided, which comprises a rotational micro-actuator as describe above; a head element (19), which coupled to the rotational micro-actuator by mounting to said two end coupling portions of the frame; a suspension, on which the rotational micro-actuator mounted by securing the central coupling portion to the central region of the suspension tongue such that said head element, the micro-actuator and the suspension stack together in order, thereby said micro-actuator together with said head element can rotate independent of the suspension about the joint between the micro-actuator and the suspension tongue. The HGA with above configuration has an improved performance since it employs the rotational micro-actuator of this invention.

Preferably, there are coupling gaps formed between the head element and said micro-actuator, and between micro-actuator and the suspension tongue. The gap between the head element and said micro-actuator will makes the deformation of the micro-actuator not be hindered by the head element, on the other hand, the gap between the micro-actuator and the suspension tongue allows for the free rotation of the micro-actuator about the joint without interference with the suspension.

In still other aspect of this invention, a hard disk driver unit is provided, which comprise a disk; a pivot center, about which said disk rotates; a VCM driver for driving a head element to move above the surface of the disk, and a head gimbal assembly connected to said VCM driver for the fine adjustment of the position of the head element; wherein said head gimbal assembly includes a rotational micro-actuator as described above. The servo bandwidth of this hard disk driver is greatly expanded since the hard disk driver employs the rotational micro-actuator of this invention.

Further, a method of manufacturing the head gimbal assembly is provided, which comprises the steps of: providing a rotational micro-actuator as above-described; mounting said rotational micro-actuator to said suspension tongue by fixing the central coupling portion of the frame to the suspension tongue; coupling electrically the rotational micro-actuator with the suspension trace; mounting a head element to said rotational micro-actuator; coupling electrically the head element with the suspension trace.

Other method of manufacturing the head gimbal assembly comprises the steps of: providing a rotational micro-actuator as described above, mounting a head element to said rotational micro-actuator; mounting the assembly of the head element and said rotational micro-actuator to said suspension tongue by fixing the central coupling portion of the frame to the suspension tongue; coupling electrically the rotational micro-actuator and the head element with the suspension traces respectively.

Above methods of manufacturing the head gimbal assembly may further comprise the step of testing the head element and/or the rotational micro-actuator.

Other characteristics and advantages of this invention will become apparent on reading following detailed description of the embodiments of the invention, given as examples only, and with reference to the drawing.

BRIEF DESCRIPTION OF THE DRAWINGS

FIG. 2a shows the detail structure of the HGA shown in FIG. 1;

FIG. 2b shows enlarged partially view of the front end of the HGA in FIG. 2a;

FIG. 4b shows the enlarged partially view of the front end of the HGA in FIG. 4a;

DESCRIPTION OF THE PREFERRED EMBODIMENTS

Figure 1:
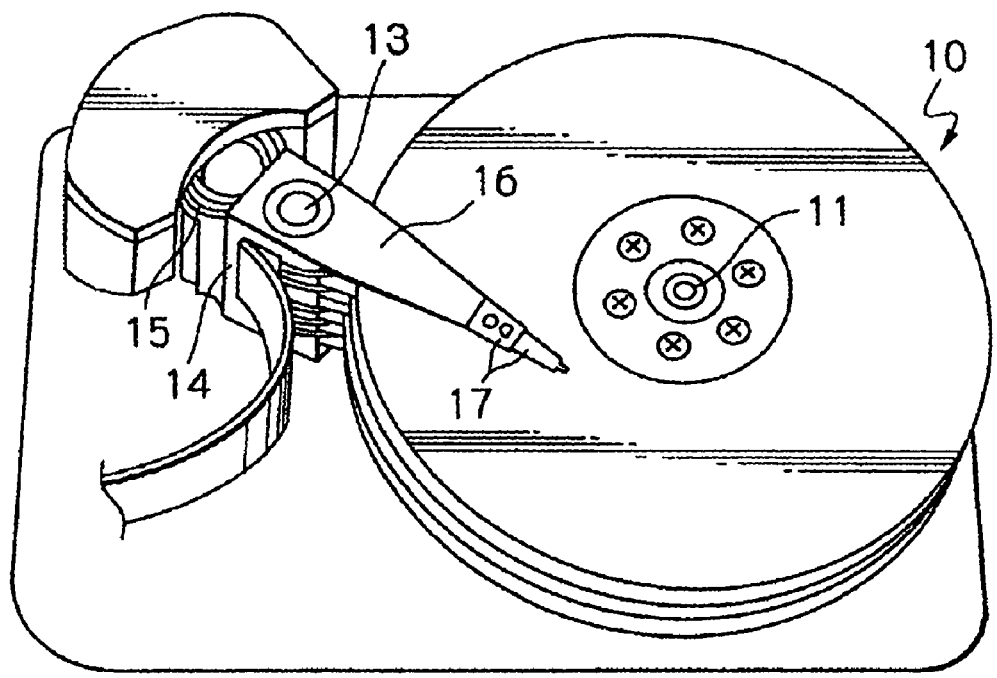
FIG. 1 shows the typical configuration of the typical HDD employing the conventional micro-actuator.
Figure 2B:
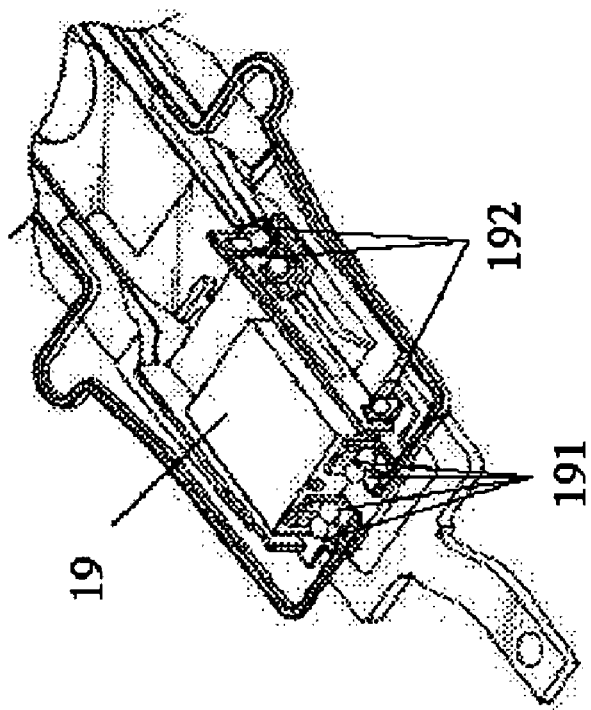
Figure 2C:
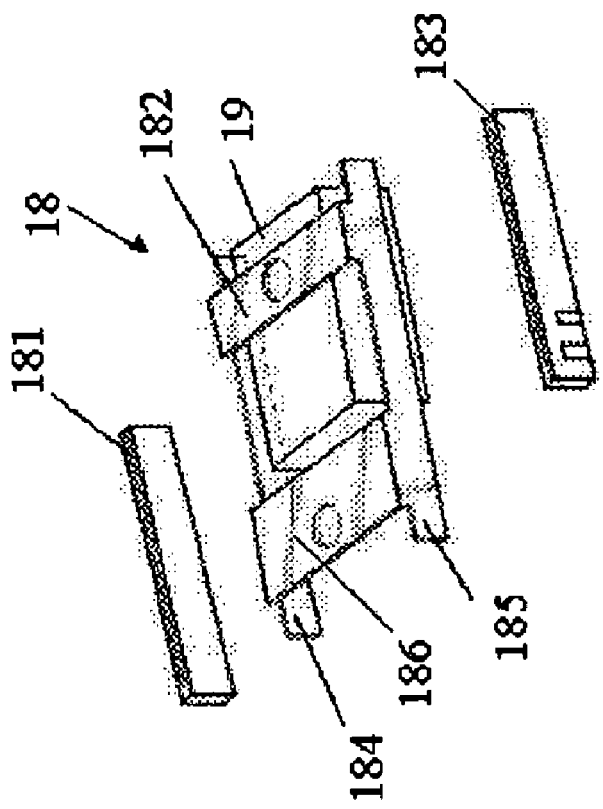
FIG. 2c is an exploded perspective view of the conventional micro-actuator in turn over state.
Figure 2D:
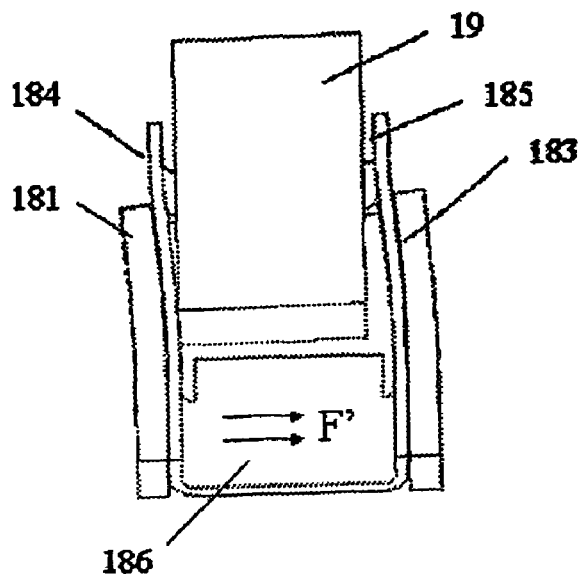
FIG. 2d shows the operation state of the conventional micro-actuator.
Figure 2E:
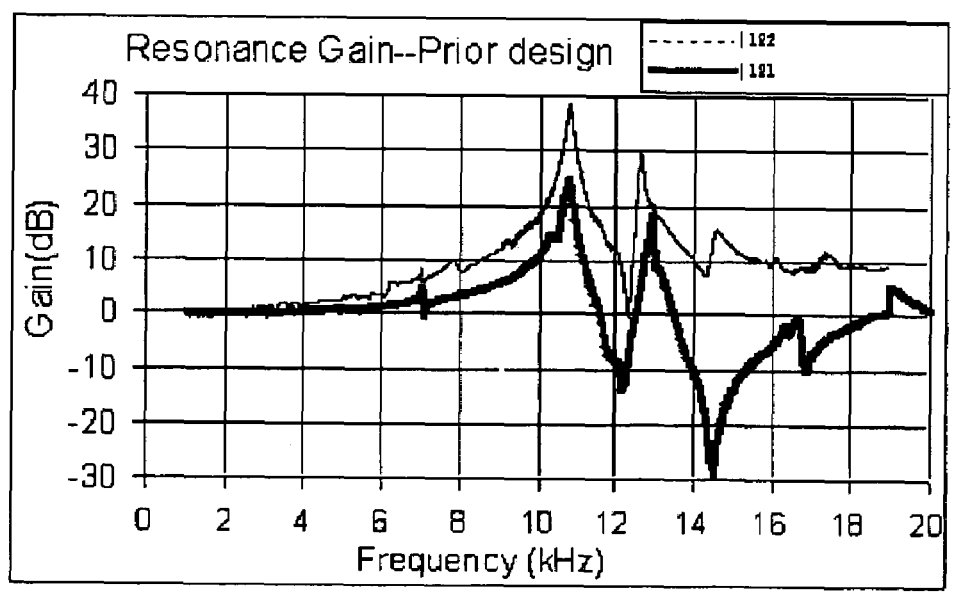
FIG. 2e shows the curves of the resonance gain vs. exciting frequency of the PZT pieces and the base plate of the suspension respectively.

In this description, like components or the components with like function are denoted with same or similar reference numerals.

Figure 3A:
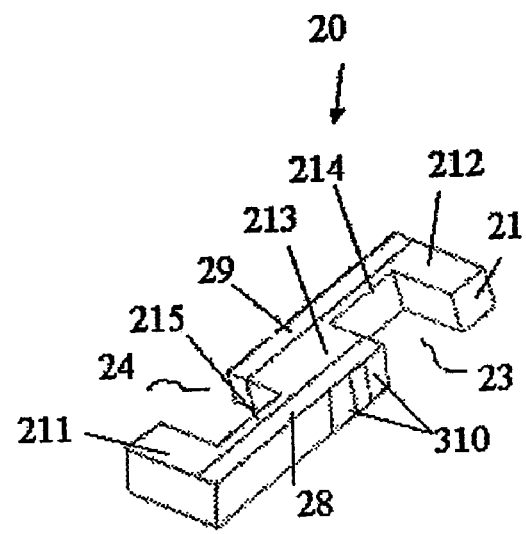
FIG. 3a is a perspective view showing the structure of the rotational micro-actuator according to one embodiment of this invention.

FIG. 3a shows the configuration of the micro-actuator 20 according to an embodiment of this invention. As can be seen, the micro-actuator includes a frame 21 and two pieces of PZT 28, 29 attached to the frame 21. The frame 21 is made of ceramic material or metal material, and includes two end coupling portions 211 and 212 formed at its two ends respectively for carrying the head element (not shown), a central coupling portion 213 formed at its approximately center for connecting to the suspension tongue (not shown), and two arms 214 and 215 formed between the end coupling portion 212 and the central coupling portion 213, between the end coupling portion 211 and the central coupling portion 213 respectively, on the outside surface of which the PZT pieces 28 and 29 are attached in such a manner that the PZT pieces 28 and 29 are central symmetrical with each other about the central coupling portion 213. Therefore, when the PZT pieces 28 and 29 deforms in response to the driving signal applied, the arms 214 and 215 of the frame 21 will deform together, thereby the micro-actuating effect is produced.

Preferably, to facilitate the deforming of the frame 21, a notch 23 is formed on the side of the arm 214 opposite to the PZT pieces 29. Similarly, another notch 24 is formed on the side of the arm 215 opposite to the PZT pieces 28. The notches 23 and 24 are opened in opposite directions so that the whole frame 21 approximately takes the shape of letter "S". The deformation portions of the frame 21 are formed thinner by the formation of the notches 23 and 24 so as to facilitate the deforming of the frame 21.

The structure of the frame 21 of the micro-actuator 20 of this invention is not limited to above-identified "S" shape. For example, frame 21 may be formed to be in "I" shape including a central linear arm. In this case, two PZT pieces are arranged in two side surfaces of the central linear arm of the frame in central symmetric manner about the center of the linear arm. In this case, the function of the rotational micro-actuator can also be achieved.

Figure 3B:
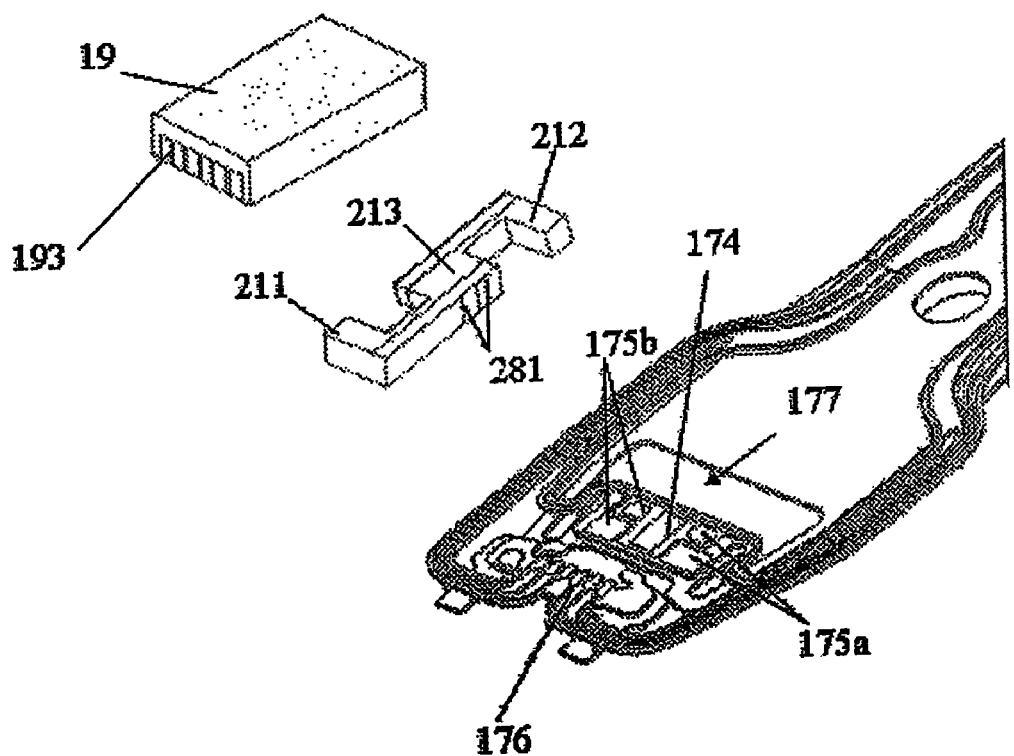
FIG. 3b is a view showing the relative position relationship among the head element, the rotational micro-actuator according to one embodiment of this invention and the suspension tongue.
Figure 3C:
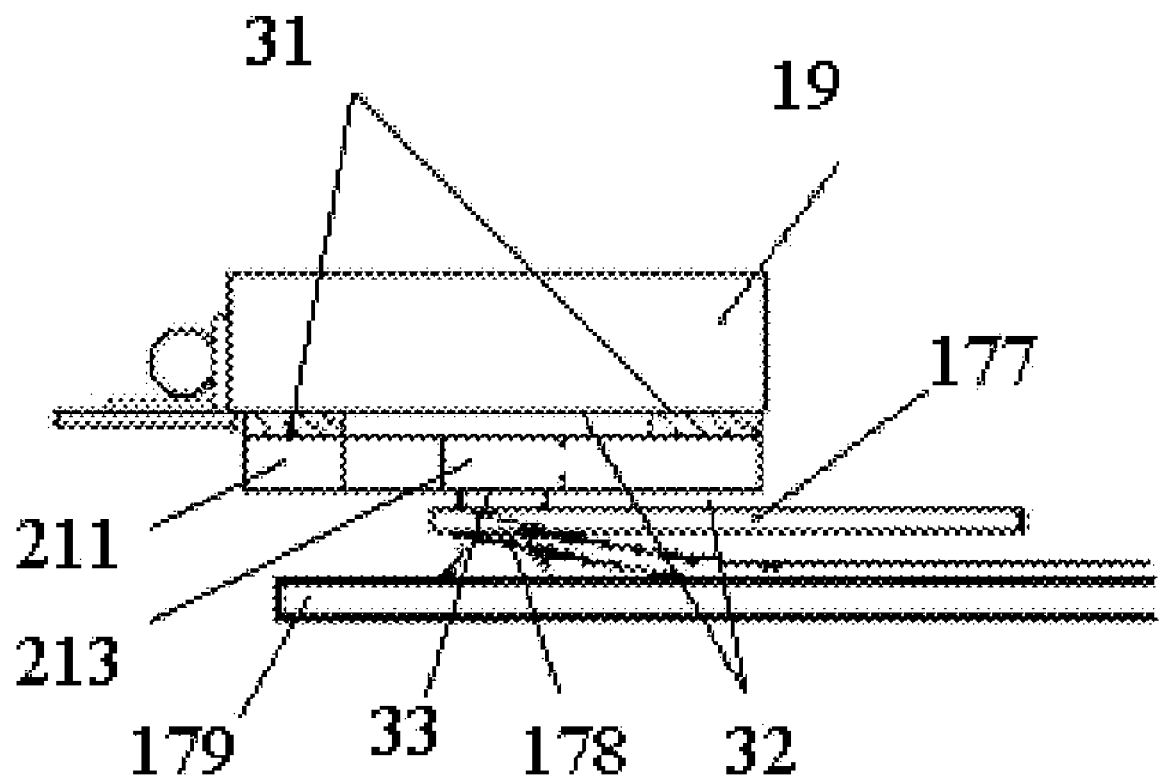
FIG. 3c is a side view of the micro-actuator according to one embodiment of this invention in assembled state.

FIG. 3b shows the relative position relationship of the head element 19, micro-actuator 20 and the suspension tongue 177 prior to the assembling of the micro-actuator 20 of this invention. FIG. 3c shows the side view of the micro-actuator after mounting. As can be seen, the rotational micro-actuator 20 of this invention is arranged between the head element 19 and suspension tongue 177. More specifically, the head element 19 is fixedly secured to the top surface of the micro-actuator 20 by the joint 31 formed at the end coupling portions 211 and 212. The micro-actuator 20 in turn is mounted on the central region 174 of the suspension tongue 177 by the joint 33 formed at the central coupling portion 213. There are gaps 32 formed between the head element 19 and micro-actuator 20, micro-actuator 20 and the suspension tongue 177. The gap 32 between the micro-actuator 20 and the suspension tongue 177 facilitates the micro-actuator 20 to rotate freely about joint 33 above the suspension tongue 177, while the gap 33 between the head element 19 and micro-actuator 20 ensures that the head element 19 is connected to the micro-actuator 20 only by two joints 31 such that head element 19 will not hinder the deformation of the frame arms 214 and 215, and can displace with the end coupling portions 211 and 212 freely. Referring to FIG. 3c, the suspension tongue 177 is supported by the load beam 179 via dimple 178. The supporting structure is well known to the ordinary one skilled in this field and the further description is omitted.

In addition, after the micro-actuator 20 is mounted to the suspension tongue 177, the pads 193 formed on the head element 19 and the pads 176 formed on the suspension tongue 177 are soldered together by conventional bonding method such as SBB (soldering ball bonding) or GBB (gold ball bonding) method, similarly, the pads 281 formed on the PZT pieces 28 and 29 of the micro-actuator 20 and the pads 175a and 175b formed on the suspension tongue are also soldered together such that the micro-actuator 20 is electrically coupled.

Figure 4A:
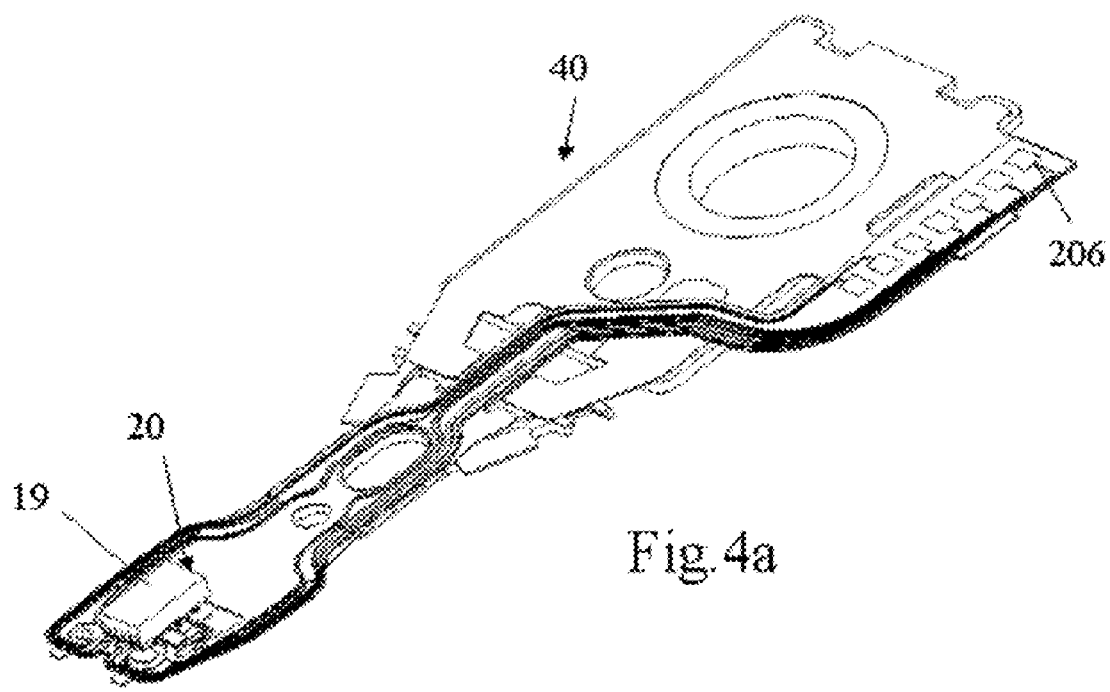
FIG. 4a shows the structure of the HGA employing the rotational micro-actuator according to one embodiment of this invention.
Figure 4B:
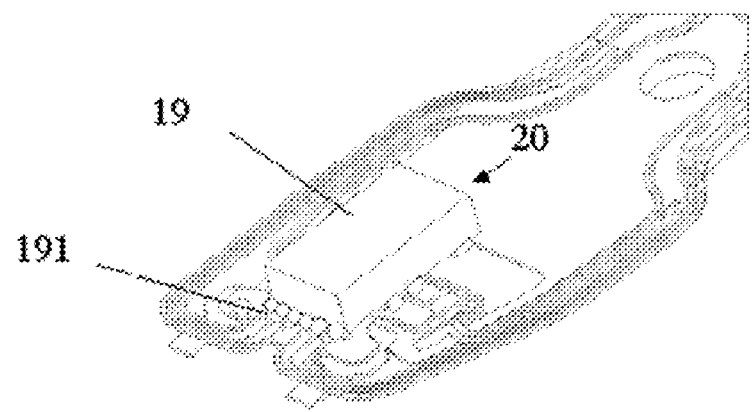

FIG. 4a shows the HGA 40 employing the rotational micro-actuator 20 of this invention. FIG. 4b shows the enlarged partial view of the front end of the HGA 40. Since the structure of the HGA 40 is similar with the conventional HGA 17 except that the rotational micro-actuator 20 of this invention is employed, the detail description thereof is omitted.

Figure 5A:
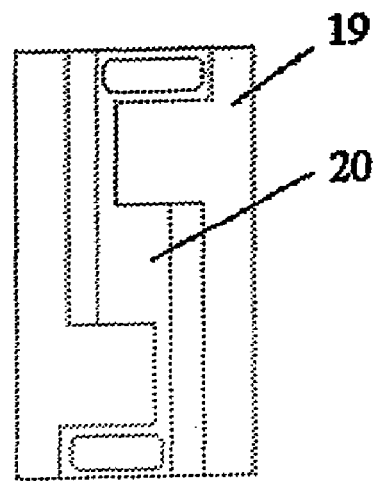
FIGS. 5a and 5b show the standby and operating state of the rotational micro-actuator according to one embodiment of this invention respectively.
Figure 5B:
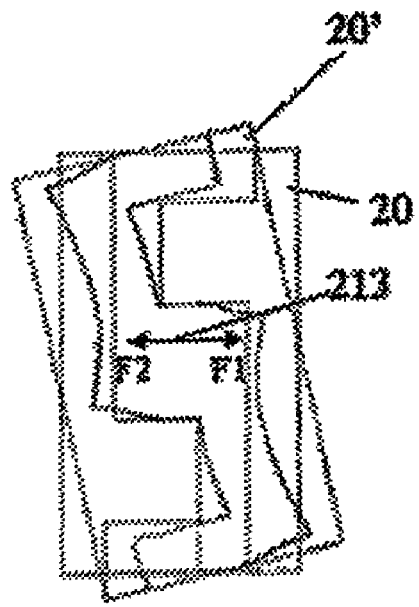

The operating procedure of the rotational micro-actuator 20 of this invention will be described below. FIG. 5a and FIG. 5b show the plan view of the assembled micro-actuator 20 and head element 19 in standby state and in operating state respectively. For the sake of clarity, the head element 19 is represented only by its contour line. As shown in FIG. 5a, the head element 19 maintains its initial standby position when no driving signal is applied to the micro-actuator 20. As can be seen from FIG. 5a, when the driving signals are applied to the two pieces PZT of the micro-actuator 20, the PZT pieces deform. Since these two pieces of PZT are arranged in center symmetric manner about the central coupling portion 213, the deformations of these PZT pieces in opposite directions will lead to the rotation of the micro-actuator 20 with the head element 19 about the central coupling portion 213 to the position shown by the reference numeral 20'. Therefore, the fine positioning of the head element 19 can be achieved by the rotation movement of the head element 19.

In comparison with the conventional translation mode (or sway mode) micro-actuator, the rotational micro-actuator of this invention will not cause the resonance of the suspension during operating procedure, since the reaction force F1 and F2 applied to the suspension tongue balance out due to the central symmetric arrangement of the PZT pieces attached to the frame. More specifically, as shown in FIG. 5b, when the PZT piece located on the left and upper position deforms to the left, a reaction force F1 is applied to the suspension; on the other hand, when the PZT piece located on the right and lower position deforms to the right, a reaction force F2 is applied to the suspension. F1 is equal to F2 while the directions of F1 and F2 oppose, thus the F1 and F2 will balance to zero. Therefore, the rotation movement of the micro-actuator about joint 33 (FIG. 3d) will not cause the resonance of the suspension. That is to say, the rotational micro-actuator of this invention can suppress the resonance of the suspension and accordingly improve the servo bandwidth of the HDD.

Figure 6A:
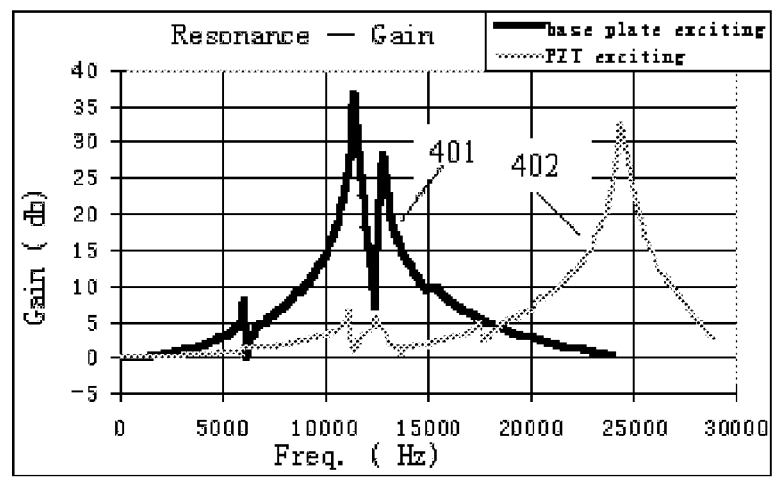
FIG. 6a shows the curves of the resonance gain vs. frequency of the PZT pieces and the base plate of the suspension when the rotational micro-actuator according to one embodiment of this invention operates.
Figure 6B:
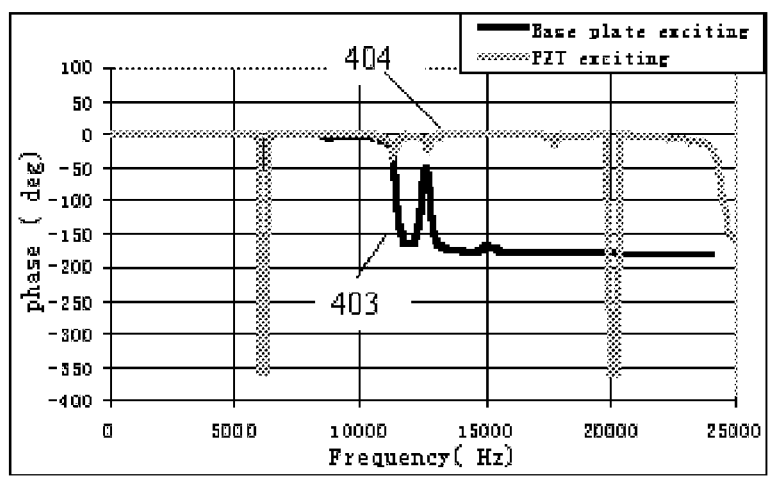
FIG. 6b shows the curves of resonance phase vs. frequency of the PZT pieces and the base plate of the suspension when the rotational micro-actuator according to one embodiment of this invention operates.

In order to verify the effect of the rotational micro-actuator of this invention, the curves illustrating the resonance gains of the PZT pieces and the base plate of the suspension are shown in FIG. 6a, while FIG. 6b shows the curves illustrating their resonance phases. As can be learn from the curves, the resonance curve 402 of the PZT pieces and the resonance curve 401 of the suspension base plate do not accompany each other, but separate from each other, this means that the PZT movements do not excite the resonance of the base plate of the suspension, which is advantageous for the precise positioning of the head element 19.

Figure 7:
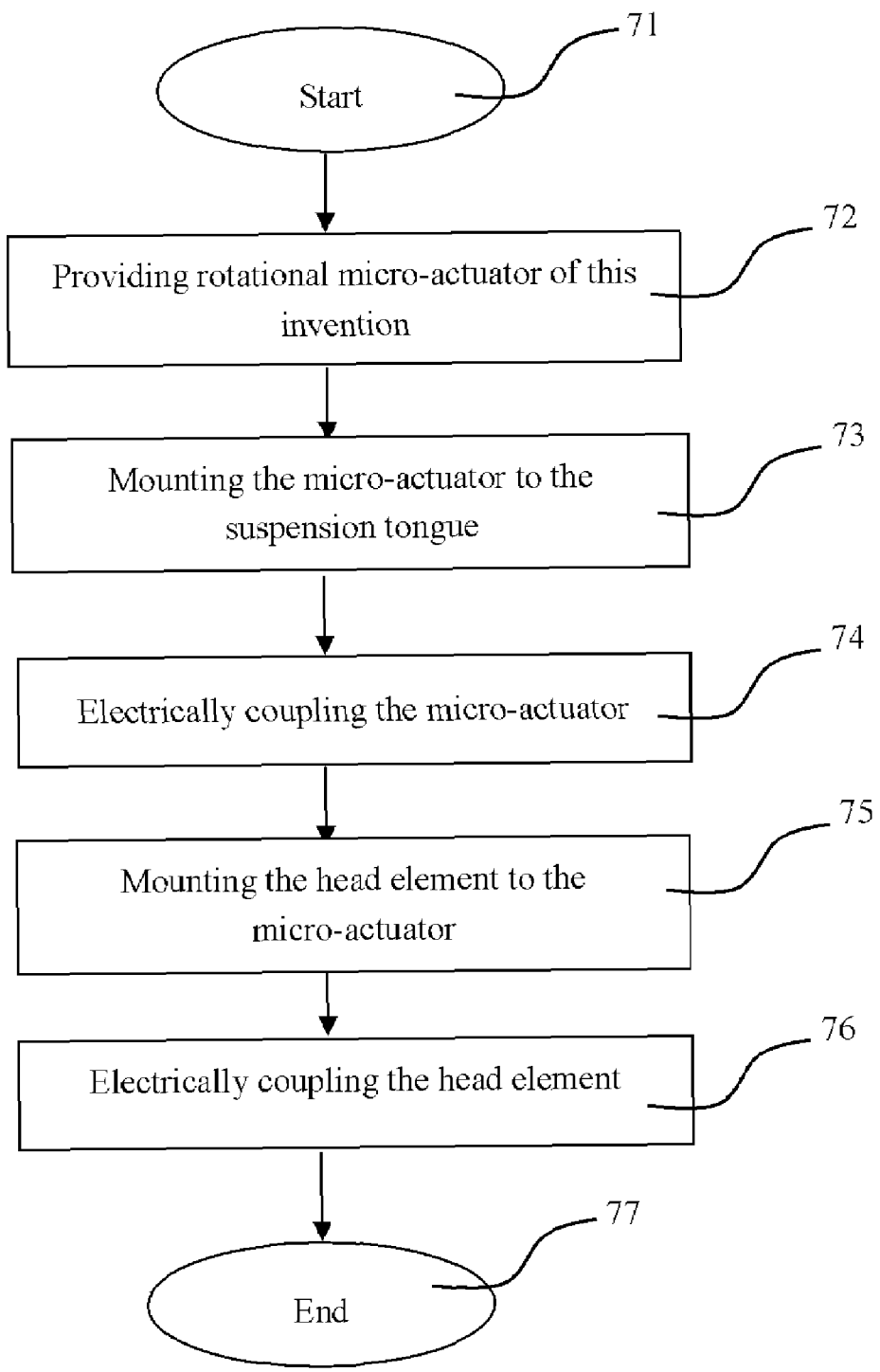
FIGS. 7 and 8 show the flow charts for manufacturing the HGA according to this invention respectively.
Figure 8:
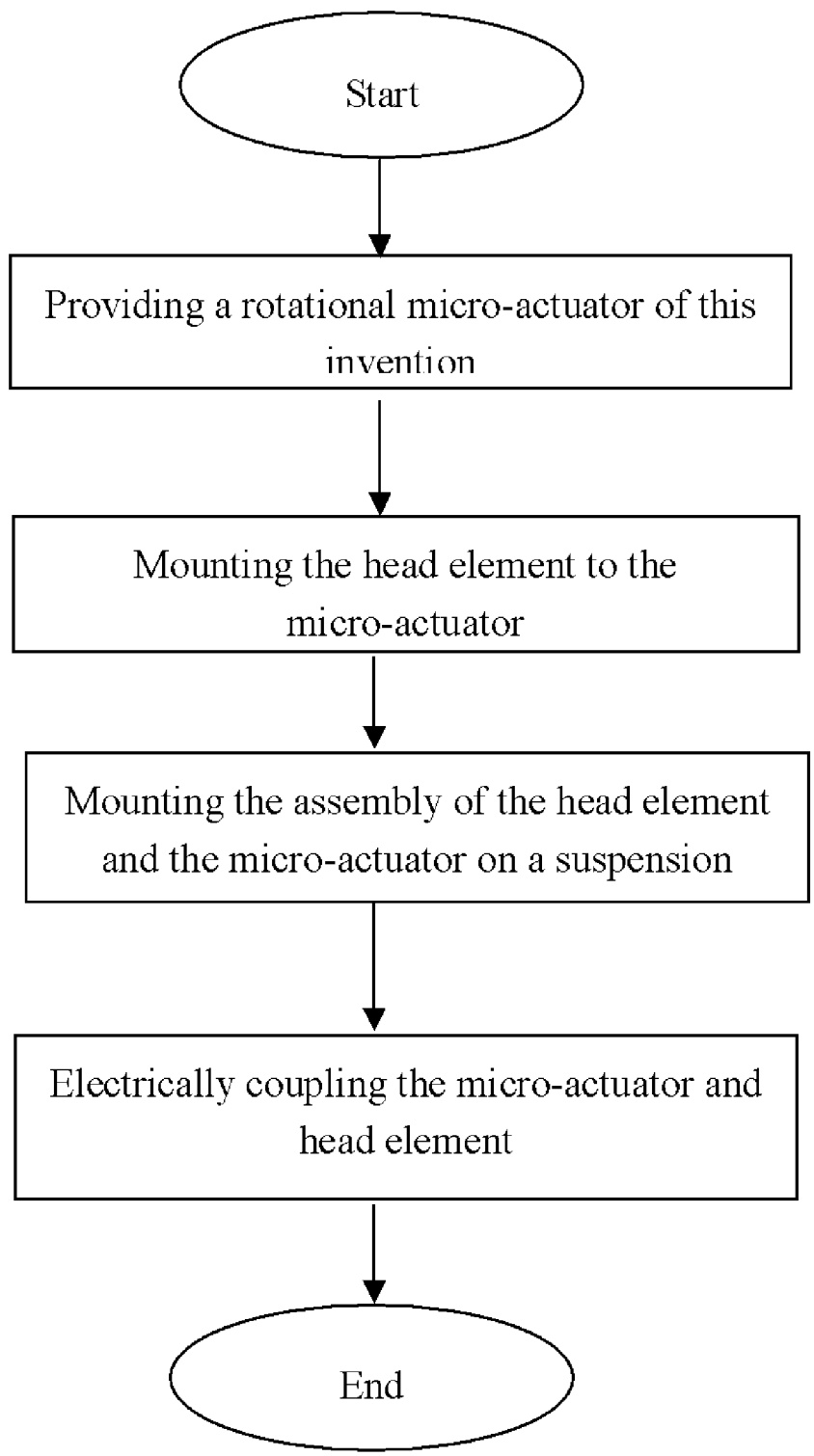

FIG. 7 and FIG. 8 illustrate the flow charts of the method for manufacturing the HGA 40 according to this invention respectively.

As shown in FIG. 7 in conjunction with FIG. 3b, the method starts at step 71. The micro-actuator 20 of this invention, of which the PZT pieces are arranged in center symmetry manner, is provided in step 72. Then proceeds to step 73, the micro-actuator 20 as formed is mounted to the suspension tongue 177 by fixing the central coupling portion 213 to the central area 174 of the suspension tongue. After the mounting of the micro-actuator, the electric coupling of the micro-actuator with the suspension pad is performed in step 74. As shown in FIG. 3b, it is achieved by soldering the pad 281 formed on the PZT pieces 28, 29 of the micro-actuator to the pad 175*a* and 175*b* formed on the suspension tongue. After that, in step 75, the head element 19 is mounted on the top surface of the micro-actuator 20. As shown in FIG. 3*c*, this is achieved by connecting the under surface of the head element 19 to the end coupling portion 211 and 212 of the micro-actuator 20. After completing the mechanical mounting of the head element, the electrical connecting of the head element, which is achieved by soldering the pad 193 of the head element 19 to the pad 176 formed on the suspension tongue as shown in FIG. 3*b*, is performed in step 76. The manufacturing procedure is completed in step 77 after the head element 19, micro-actuator 20 and suspension tongue 177 are mechanically and electrically coupled together.

In another preferable embodiment, the manufacturing procedure of the HGA of this invention further includes the step of testing the performance of the head element and the micro-actuator, the step of visualizing monitor, and the step of cleaning and HAS processing the whole assembled component.

FIG. 8 shows an alternative flow chart for manufacturing the HGA 40 of this invention, which differs from that shown in FIG. 7 only in that the head element is firstly mounted to the micro-actuator, and then the assembly of the head element and the micro-actuator is mounted to the suspension tongue as an integrated component. Thus the further description of FIG. 8 will be omitted.

Figure 9:
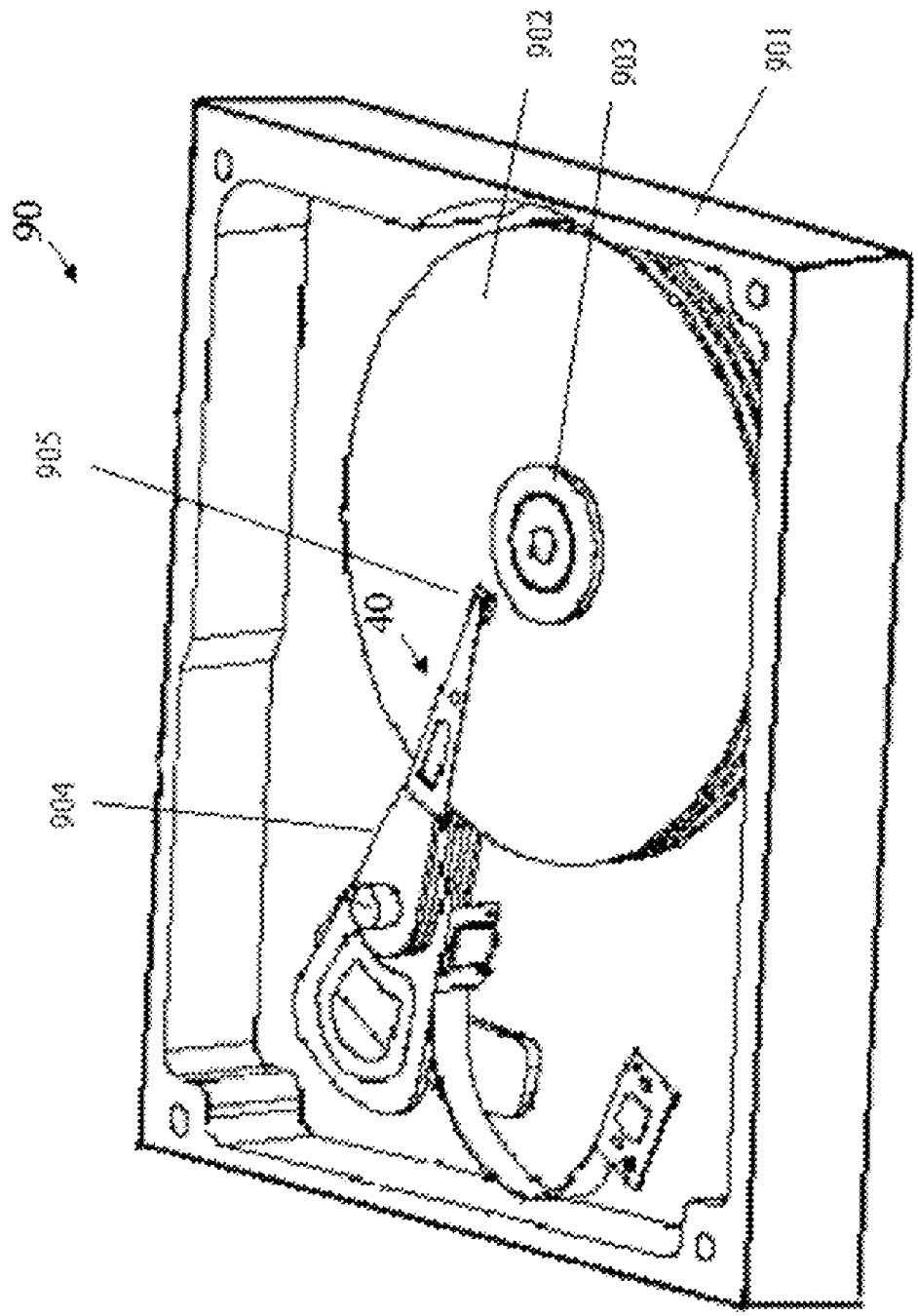
FIG. 9 shows a disk drive unit using the micro-actuator of this invention.

FIG. 9 shows a HDD 90 employing the HGA 90 of this invention, which comprises a housing 901, a disk 902 accommodated in said housing 901; a pivot center 903, about which said disk 902 rotates in said housing 901; a VCM 904 for driving the HGA 40 coupled to said VCM 904 to move above the surface of the disk 902. Said head gimbal assembly 40 comprises a micro-actuator 20 of this invention.

Although the rotational micro-actuator of this invention is described by example of one preferred embodiment, it should be understood that the present invention is not limited to the specific embodiments described in the specification, other equivalent arrangements are also feasible as long as the PZT pieces are provided in central symmetry manner so as to the reaction forces applied to the suspension can balance out. Therefore, the scope of this invention is defined only by the appended claims.

What is claimed is:

1. A rotational micro-actuator comprising a metal frame and PZT pieces attached to said metal frame, characterized in that said metal frame is formed with a central coupling portion by which the micro-actuator is coupled to a suspension tongue, and two pieces of said PZT are arranged in central symmetry manner about said central coupling portion such that said micro-actuator can rotate about said central coupling portion in response to the driving signals applied to said PZT pieces, wherein said metal frame is formed with an end coupling portion at the two ends thereof, by which a head element is fixedly mounted to said rotational micro-actuator, wherein said metal frame includes two arms, which are formed to be central symmetric with each other about said central coupling portion, between said end coupling portion and said central coupling , and said PZT pieces being attached to the outside surfaces of said arms, wherein a first notch and a second notch are formed on the respective sides of the arms to which the PZT pieces are not attached in such a manner that the first notch and second notch open in opposite direction such that the whole metal frame takes the share of letter "S".

2. A head gimbal assembly comprising:

a rotational micro-actuator, which comprises a metal frame and PZT pieces attached to said metal frame, wherein said metal frame is formed with a central coupling portion by which said micro-actuator is coupled to a suspension tongue, and two pieces of said PZT are arranged in central symmetry manner about said central coupling portion such that said micro-actuator can rotate about said central coupling portion in response to the driving signals applied to said PZT pieces;

a head element, which coupled to the rotational micro-actuator by mounting to said two end coupling portions of the metal frame;

suspension, on which the rotational micro-actuator mounted by securing the central coupling portion to the central region of the suspension tongue such that said head element, micro-actuator and the suspension stack together in order, thereby said micro-actuator together with said head element can rotate independent of the suspension about the joint between the micro-actuator and the suspension tongue.

3. A head gimbal assembly as claimed in claim 2, wherein there are coupling gaps between the head element and said micro-actuator, and between the micro-actuator and the suspension tongue.

4. A hard disk driver unit comprising a disk;

a pivot center, about which said disk rotates;

a VCM driver for driving a head element to move above the surface of the disk, and a head gimbal assembly connected to said VCM driver for fine adjustment of the position of the head element;

characterized in that said head gimbal assembly includes a rotational micro-actuator, which comprises a metal frame and PZT pieces attached to said metal frame, wherein said metal frame is formed with a central coupling portion by which the micro-actuator is coupled to a suspension tongue of the head gimbal assembly, and two pieces of said PZT are arranged in central symmetry manner about said central coupling portion such that said micro-actuator can rotate about said central coupling portion in response to the driving signals applied to said PZT pieces.

5. A method of manufacturing a head gimbal assembly, comprising the steps of:

providing a rotational micro-actuator, which comprising metal frame and PZT pieces attached to said metal frame, wherein said metal frame is formed with a central coupling portion by which the micro-actuator is coupled to a suspension tongue, and two pieces of said PZT are arranged in central symmetry manner about said central coupling portion such that said micro-actuator can rotate about said central coupling portion in response to the driving signals applied to said PZT pieces;

mounting said rotational micro-actuator to said suspension tongue by fixing the central coupling portion to the suspension tongue;

coupling electrically the rotational micro-actuator with suspension traces;

mounting a head element to said rotational micro-actuator;

coupling electrically the head element with suspension traces.

6. A method of manufacturing a head gimbal assembly as claimed in claim 5 further comprising the step of testing the head element and/or the rotational micro-actuator.

7. A method of manufacturing a head gimbal assembly, comprising the steps of:

providing a rotational micro-actuator, which comprising a metal frame and PZT pieces attached to said metal frame, wherein said metal frame is formed with a central coupling portion by which the micro-actuator is coupled to a suspension tongue, and two pieces of said PZT are arranged in central symmetry manner about said central coupling portion such that said micro-actuator can rotate about said central coupling portion in response to the driving signals applied to said PZT pieces;

mounting a head element to said rotational micro-actuator;

mounting the assembly of the head element and said rotational micro-actuator to said suspension tongue by fixing the central coupling portion to the suspension tongue;

coupling electrically the rotational micro-actuator and the head element with suspension traces respectively.

8. A method of manufacturing a head gimbal assembly as claimed in claim 7, further comprising the step of testing the head element and/or the rotational micro-actuator.

* * * * *

UNITED STATES PATENT AND TRADEMARK OFFICE
CERTIFICATE OF CORRECTION

PATENT NO.       : 7,643,253 B2                                     Page 1 of 1
APPLICATION NO.  : 11/536558
DATED            : January 5, 2010
INVENTOR(S)      : Yao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 495 days.

Signed and Sealed this

Sixteenth Day of November, 2010

David J. Kappos
*Director of the United States Patent and Trademark Office*